US012769577B2

(12) United States Patent
Curtin et al.

(10) Patent No.: US 12,769,577 B2
(45) Date of Patent: Oct. 20, 2026

(54) EXECUTING A SOFTWARE PROGRAM THAT USES A DIFFERENT MEMORY-PAGE SIZE THAN ITS HOST COMPUTING ENVIRONMENT

(71) Applicant: Red Hat, Inc., Raleigh, NC (US)

(72) Inventors: Eric Curtin, Dublin (IE); Sergio Lopez Pascual, Saragossa (ES)

(73) Assignee: Red Hat, Inc., Raleigh, NC (US)

( * ) Notice: Subject to any disclaimer, the term of this patent is extended or adjusted under 35 U.S.C. 154(b) by 350 days.

(21) Appl. No.: 18/633,663

(22) Filed: Apr. 12, 2024

(65) Prior Publication Data

US 2025/0321772 A1 Oct. 16, 2025

(51) Int. Cl.
*G06F 3/00* (2006.01)
*G06F 9/455* (2018.01)

(52) U.S. Cl.
CPC .................... *G06F 9/45558* (2013.01); *G06F 2009/45562* (2013.01); *G06F 2009/45583* (2013.01)

(58) Field of Classification Search
CPC .......................................................... G06F 9/48
See application file for complete search history.

(56) References Cited

U.S. PATENT DOCUMENTS

| | | | | |
|---|---|---|---|---|
| 8,838,913 | B1 * | 9/2014 | Conover | G06F 12/08 718/1 |
| 10,241,874 | B2 * | 3/2019 | Cao | G06F 11/2048 |
| 10,902,014 | B1 * | 1/2021 | Adogla | G06F 16/27 |
| 2015/0309736 | A1 * | 10/2015 | Baskakov | G06F 3/0611 711/165 |
| 2018/0088975 | A1 * | 3/2018 | Kaul | G06F 9/45558 |
| 2020/0379791 | A1 * | 12/2020 | Tsirkin | G06F 3/067 |
| 2022/0121473 | A1 * | 4/2022 | Gong | G06F 9/45558 |
| 2022/0214907 | A1 * | 7/2022 | Wang | G06F 9/5016 |

OTHER PUBLICATIONS

Prateek Sharma, Containers and Virtual Machines at Scale: A Comparative Study. (Year: 2016).*

* cited by examiner

*Primary Examiner* — Lechi Truong
(74) *Attorney, Agent, or Firm* — Kilpatrick Townsend & Stockton LLP

(57) ABSTRACT

Techniques for executing a software program that uses a different memory-page size than its host computing environment are described. As one example, a system can deploy a virtual machine in a host computing environment of the computing device. The host computing environment can include a host operating system that is configured to use a first memory page size. The virtual machine can be configured to use a second memory page size that is different from the first memory page size. Based on a software program being configured to use the second memory page size, the system can execute the software program in the virtual machine.

20 Claims, 7 Drawing Sheets

EXECUTING A SOFTWARE PROGRAM THAT USES A DIFFERENT MEMORY-PAGE SIZE THAN ITS HOST COMPUTING ENVIRONMENT

TECHNICAL FIELD

The present disclosure relates generally to executing software that uses memory pages of a certain size. More specifically, but not by way of limitation, this disclosure relates to executing a software program that uses a different memory-page size than its host computing environment.

BACKGROUND

A memory page (or "page") is a fixed-length block of contiguous virtual memory, described by a single entry in a page table. It is the smallest unit of memory for memory management in an operating system that uses virtual memory. Various central processing units (CPUs) also have instruction set architectures that define their memory page sizes. The most common page size is 4 kilobytes (KB), as seen in Power, x86, ARMv7, RISCV, etc. Although the 4 KB page size has been dominant in the industry for decades, it is becoming more common for software and hardware use larger page sizes, such as 16 KB, 64 KB, etc. For example, some CPU architectures such as AArch64 use larger page sizes.

DETAILED DESCRIPTION

A memory page (or "page") is a fixed-length block of contiguous virtual memory. Different operating systems may be configured to use different page sizes. The page size for a given operating system is normally defined during the build time of the operating system and, thus, cannot be changed at runtime. For example, the Linux kernel does not provide a way to switch the page size at runtime. Therefore, the page size can normally only be switched during the build time of the Linux kernel (e.g., the time at which the source code for the kernel is compiled into machine code). Because the most commonly used page size is 4 KB, many software programs make the assumption that the underlying operating system on which it will run uses a page size of 4 KB. But if the page size used by the operating system is actually different than 4 KB, it can cause problems with such software programs that expect a page size of 4 KB. Similar problems can arise in other scenarios in which the page size expected by the software does not match the page size used by the underlying operating system.

Some examples of the present disclosure can overcome one or more of the abovementioned problems by providing a way for a software program (e.g., a software application or service) to execute in a host computing environment that uses a different page size than is expected by the software program. In particular, a computing device can include a host computing environment with a host operating system that may be configured to use a first page size, such as 16 KB. An operator of the computing device may wish to deploy a software program in the host computing environment. But, the software program may be configured to use a second page size, such as 4 KB, that is different from the first page size. To allow the software program to properly execute in the host computing environment, the computing device may deploy (e.g., create, configure, and run) a virtual machine in the host computing environment. The computing device can configure the virtual machine to use the page size that is expected by the software program, which in this example is 4 KB. The computing device can then deploy the software program inside the virtual machine, which can allow the software program to execute within an environment that uses a 4 KB page size, as expected. This can prevent the types of errors described above, because there is no longer a mismatch between the software program's expected page size and its environment's actual page size.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
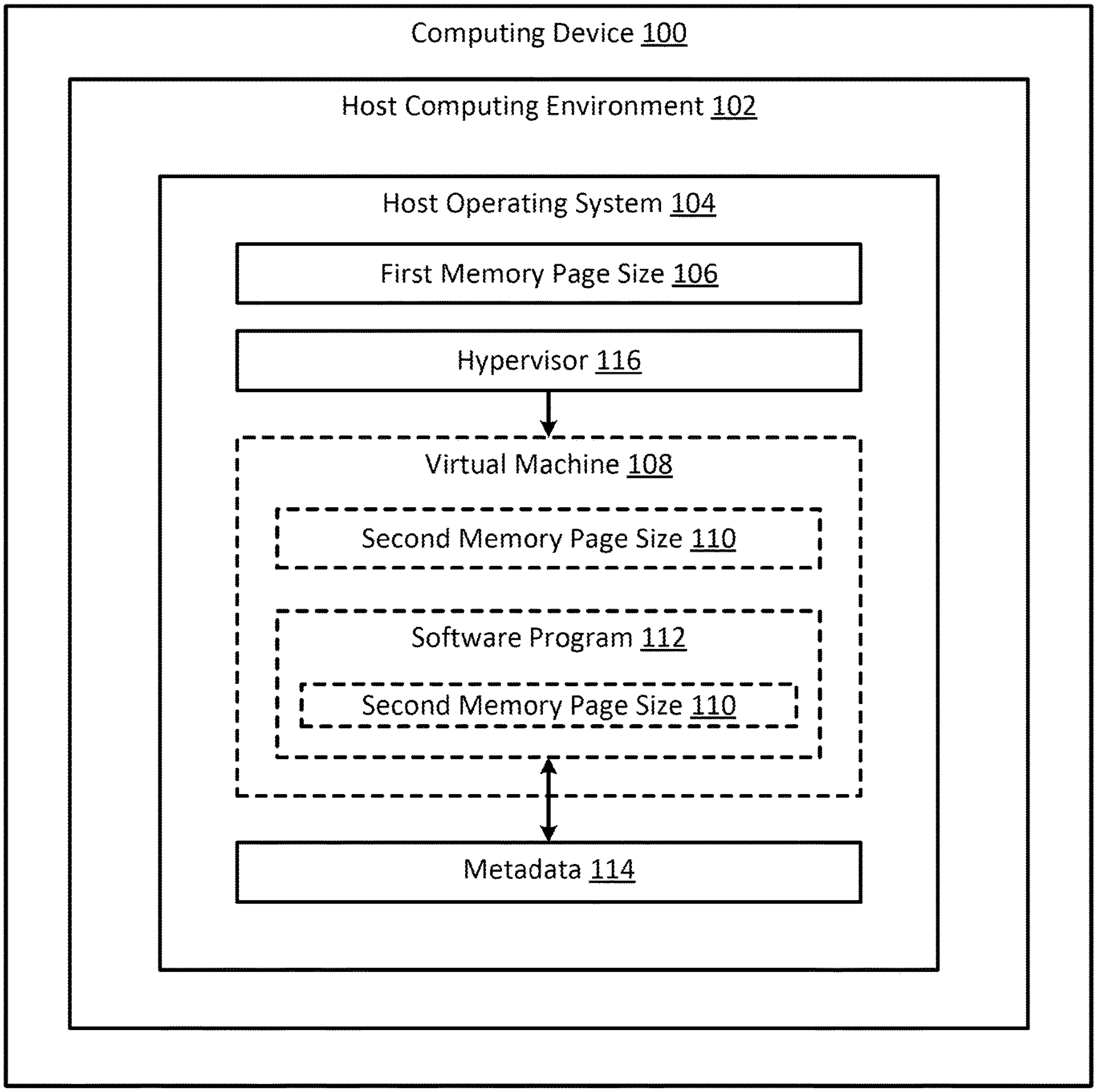
FIG. 1 shows a block diagram of a system for executing a software program that uses a different memory-page size than its host computing environment according to some aspects of the present disclosure.

FIG. 1 shows a block diagram of a system for executing a software program 112 that uses a different memory-page size than its host computing environment 102 according to some aspects of the present disclosure. The system includes a computing device 100, such as a desktop computer, laptop computer, tablet, smartphone, e-reader, server, or wearable device. The computing device 100 provides a host computing environment 102 that includes a host operating system 104. Examples of the host operating system 104 can include Linux (e.g., Red Hat Enterprise Linux®) or Windows®. The host operating system 104 can be configured to use a first memory page size 106, such as 16 KB or 64 KB. This configuration may take place during the build time of the host operating system 104. For example, the host operating system 104 may be configured to use the first memory page size 106 when its source code is compiled into machine code. Accordingly, it may be difficult or impossible to change the first memory page size 106 during the runtime of the host operating system 104.

A user of the computing device 100 may wish to deploy the software program 112 in the host computing environment 102 of the computing device 100. However, the software program 112 may be configured to use a second memory page size 110 that is different from the first memory page size 106. For example, the software program 112 may be configured to use a 4 KB page size, whereas the host operating system 104 may be configured to use a 16 KB or 64 KB page size. Normally, this may lead to execution problems with the software program 112 due to the incompatibility of these different page sizes. But, these problems may be avoided using the techniques described herein.

In particular, the computing device 100 can determine a first memory page size 105 associated with the host computing environment 102. This may involve the computing device 100 interacting with the host operating system 104 to determine which size memory page it is configured to use. The computing device 100 can also determine a second memory page size 110 associated with the software program 112. For example, the computing device 100 can access metadata 114 associated with the software program 112. The metadata 114 may be stored in a file that is separate from the software program 112 or may be part of the software program 112 itself. The metadata 114 may be downloaded, from a remote repository, concurrently with or separately from the software program 112. The metadata 114 can indicate the memory page size that is expected by the software program 112. The metadata 114 may be drafted by a developer of the software program 112 or another entity. The computing device 100 can analyze the metadata 114 to determine that the software program 112 is configured to use the second memory page size 110.

After determining the first memory page size 106 and the second memory page size 110, the computing device 100 can compare the second memory page size 110 to the first memory page size 106. In response to determining that the first memory page size 106 is different from (e.g., larger than) the second memory page size 110, the computing device 100 can interact with a hypervisor 116 to run the software program 112 inside a virtual machine 108.

Virtual machines are one popular mechanism for deploying relatively isolated virtual computing environments on a physical computer system. A virtual machine (VM) typically includes virtualized hardware and guest software. The virtualized hardware can emulate physical computer hardware. Examples of the virtualized hardware can include virtual central processing units (vCPUs), virtual random access memory (vRAM), virtual network interfaces, and virtual storage. The guest software can be any software programs that execute on top of the virtual machine. Examples of the guest software can include a guest operating system, a guest supervisory program, and one or more guest applications that may execute in userspace. Guest software is generally given limited access to the physical resources of the underlying host computing device.

The hypervisor 116 can deploy the virtual machine 108 from an image file on the computing device 100. Such images files can be referred to herein as virtual machine image files. The hypervisor 116 can be a software layer that sits below the virtual machine 108 and above the physical hardware of the computing device 100. The hypervisor 116 can execute on top of the host operating system 104 running on the computing device 100. The hypervisor 116 can provide interfaces between the virtual machine 108, the host operating system 104, and the underlying physical hardware of the host computing device 100.

As alluded to above, the hypervisor 116 can create and configure the virtual machine 108. In some examples, the hypervisor 116 can configure the virtual machine 108 to use the same memory page size as the software program 112. To do so, the computing device 100 can instruct the hypervisor 116 to configure the virtual machine 108 to use the second memory page size 110. This can create a runtime environment for the software program 112 that matches the memory page size that is expected by the software program 112.

Once the virtual machine 108 is created and configured, the computing device 100 can execute the software program 112 inside the virtual machine 108. During execution, the software program 112 can perform its intended functionality. This functionality may involve the use of various drivers to interface with the hardware of the computing device 100. For example, the software program 112 may use a graphics processing unit (GPU) driver, a network driver, or a sound driver to interface with a GPU, a network card, or a sound card, respectively, of the computing device 100.

Using the technique described above, the virtual machine 108 can serve as a relatively isolated environment in which the software program 112 can run. Because the virtual machine 108 is configured to use the same memory page size as the software program 112 (e.g., the second memory page size 110), the problems associated with mismatching page sizes between the software program 112 and its environment can be avoided. The hypervisor 116 can translate between the second memory page size 110 of the virtual machine 108 and the first memory page size 106 of the host operating system 104 as needed, to allow them to successfully interface with one another.

Figure 2:
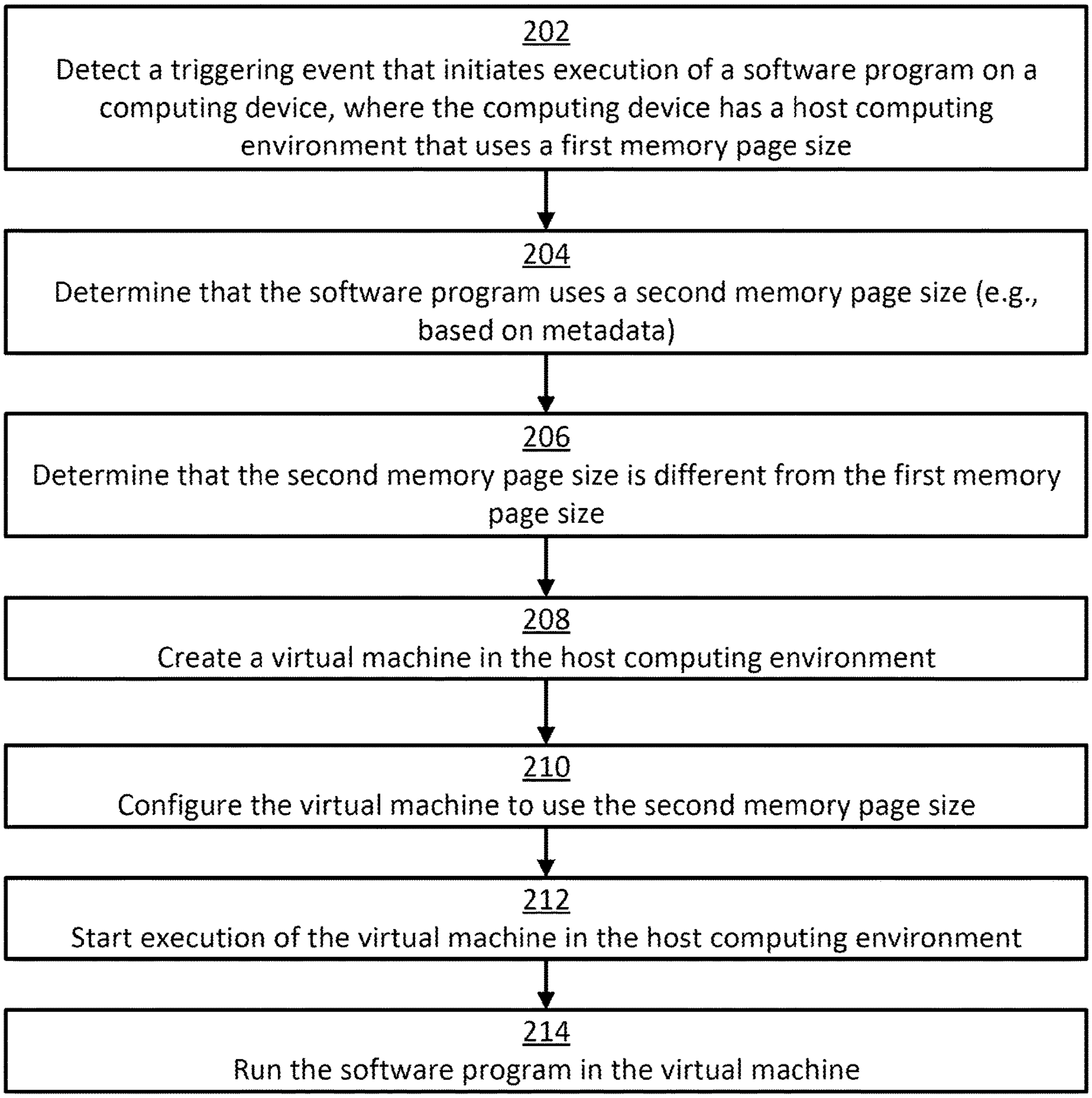
FIG. 2 shows a flowchart of an example of a process for running a software program inside a virtual machine according to some aspects of the present disclosure.

Turning now to FIG. 2, shown is a flowchart of an example of a process for running a software program 112 inside a virtual machine 108 according to some aspects of the present disclosure. Other examples may have more operations, fewer operations, different operations, or a different order of operations than is shown in FIG. 2. The process of FIG. 2 is described below with reference to the components of FIG. 1 above.

In block 202, the computing device 100 detects a triggering event that initiates execution of a software program 112 on the computing device 100. Examples of the triggering event may include a user selection of the software program 112, another software program calling the software program 112, a certain date or time, the elapsing of a predefined time period, an event detected using a sensor, a resource level being above or below a predefined threshold, etc. The computing device 100 can have a host computing environment 102 that is configured to use a first memory page size 106. For instance, the host computing environment 102 can include an operating system 104 with a built-in component (e.g., a Kernel) that is configured to use the first memory page size 106.

In block 204, the computing device 100 determines that the software program 112 uses a second memory page size 110. For example, the computing device 100 can determine that the software program 112 uses a second memory page size 110 by analyzing metadata 114 associated with the software program 112. The metadata 114 can indicate the second memory page size 110. As another example, the computing device 100 can determine that the software program 112 uses the second memory page size 110 based on a user input indicating the second memory page size 110.

The computing device 100 may determine that the software program 112 uses the second memory page size 110 at any suitable time, before or after detecting the triggering event. For example, the computing device 100 can determine that the software program 112 uses the second memory page size 110 in response to detecting the triggering event.

The second memory page size 110 can be different from the first memory page size 106. For instance, the second memory page size 110 can be smaller than the first memory page size 106 associated with the host computing environment 102.

In block 206, the computing device 100 determines that the second memory page size 110 is different than the first memory page size 106. For example, the computing device 100 can determine that the second memory page size 110 is smaller than the first memory page size 106 by comparing the two pages sizes to one another.

In block 208, the computing device 100 creates a virtual machine 108 in the host computing environment 102. The computing device 100 can use a hypervisor 116 to create the virtual machine 108.

In some examples, the computing device 100 can create the virtual machine 108 in response to detecting the triggering event. Additionally, or alternatively, the computing device 100 can create the virtual machine 108 in response to determining that the second memory page size 110 is different from the first memory page size 106. For example, the computing device 100 can create the virtual machine 108 in response to (i) detecting the triggering event and (ii) determining that the second memory page size 110 is smaller than the first memory page size 106.

In block 210, the computing device 100 configures the virtual machine 108 to use the second memory page size 110. For example, the hypervisor 116 can configure the virtual machine 108 to use the second memory page size 110. Although this step is described as distinct from operation 208, these operations may collapse into a single operation.

In block 212, the computing device 100 starts execution of the virtual machine 108 in the host computing environment 102. For example, the hypervisor 116 can start execution of the virtual machine 108. Although this step is described as distinct from operations 208-210, some or all of these operations may collapse into fewer operations.

In block 214, the computing device 100 runs the software program 112 in the virtual machine 108. For example, the hypervisor 116 can cause the software program 112 to run inside the context of the virtual machine 108. Because the virtual machine 108 has been specifically configured to use a page size that matches the page size expected by the software program 112, the issues described above may be avoided.

From the above, it will be appreciated that the computing device 100 can run the software program 112 inside the virtual machine 108 in response to detecting the triggering event and/or in response to determining that the second memory page size 110 is different from the first memory page size 106. For example, the computing device 100 can run the software program 112 in the virtual machine 108 in response to (i) detecting the triggering event and (ii) determining that the second memory page size 110 is smaller than the first memory page size 106.

Figure 3:
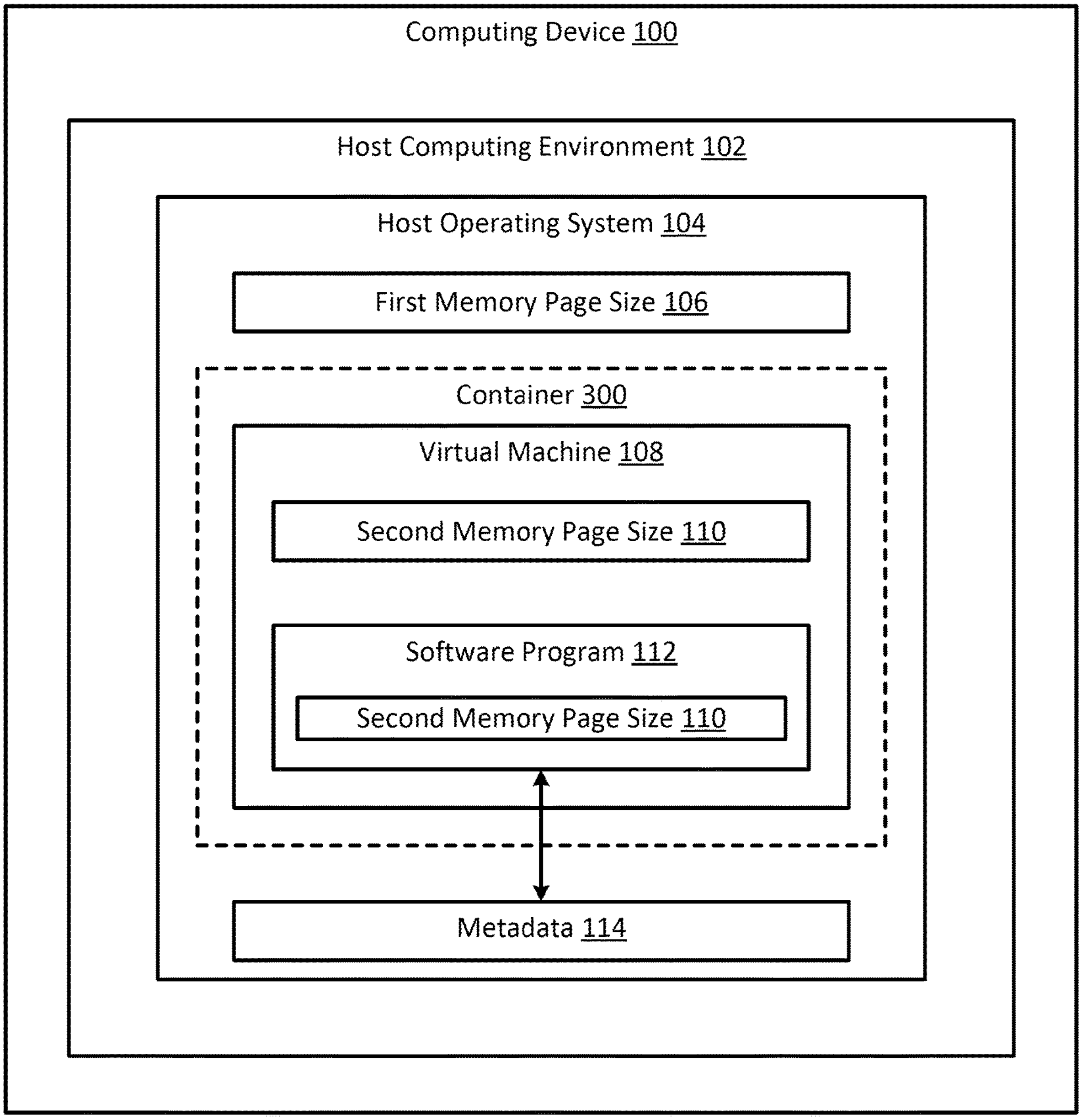
FIG. 3 shows a block diagram of an example of a system for running a virtual machine inside a container according to some aspects of the present disclosure.

Turning now to FIG. 3, shown is a block diagram of an example of a system for running a virtual machine 108 inside a container 300 according to some aspects of the present disclosure. Containers are another popular mechanism for deploying relatively isolated virtual computing environments on a physical computer system. Containers are different from virtual machines. Containers can be deployed by segregating processes and resources (e.g., memory, CPU processing power, and network resources) using features of the Linux kernel, like namespaces and cgroups. Containers can be deployed from image files, which can be referred to herein as container image files to differentiate them from virtual machine image files. In the example shown in FIG. 3, the virtual machine 108 has been deployed inside a container 300 to help further isolate and define the runtime environment for the software program 112.

More specifically, the computing device 100 can deploy the container 300 on the host operating system 104 using a container engine, such as Docker®. The container engine can be configured to deploy the container 300 from a container image file. The container 300 can be configured to have the necessary runtime environment variables and settings for the software program 112.

After deploying the container 300, the computing device 100 can deploy the virtual machine 108 inside the container 300. The computing device 100 can deploy the virtual machine 108 inside the container 300 using a hypervisor. The computing device 100 (e.g., the hypervisor) can configure the virtual machine 108 to use the same memory page size as the software program 112—e.g., the second memory page size 110. The computing device 100 can then run the software program 112 inside the virtual machine 108, which is within the container 300. Nesting the virtual machine 108 inside the container 300 can provide two nested levels of isolation. The outer level (e.g., the container 300) can establish the runtime environment for the software program 112, while the inner level (e.g., the virtual machine) can help avoid the page-size mismatch issue.

Some or all of the above process may be executed in response to the computing device 100 detecting a triggering event for running the software program 112 on the computing device 100. For example, the computing device 100 can deploy the container 300 and/or the virtual machine 108 at any suitable time, before or after detecting the triggering event (e.g., in response to detecting the triggering event). Deploying the container 300 and/or the virtual machine 108 before detecting the triggering event may make it faster to start the software program 112 inside the virtual machine 108 once triggered, but may also consume more computing resources. Conversely, deploying the container 300 and/or the virtual machine 108 after detecting the triggering event may make it slower to start the software program 112 inside the virtual machine 108 once triggered, but may consume fewer computing resources. Either way, the computing device 100 can run the software program 112 inside the virtual machine 108 in response detecting the triggering event.

Figure 4:
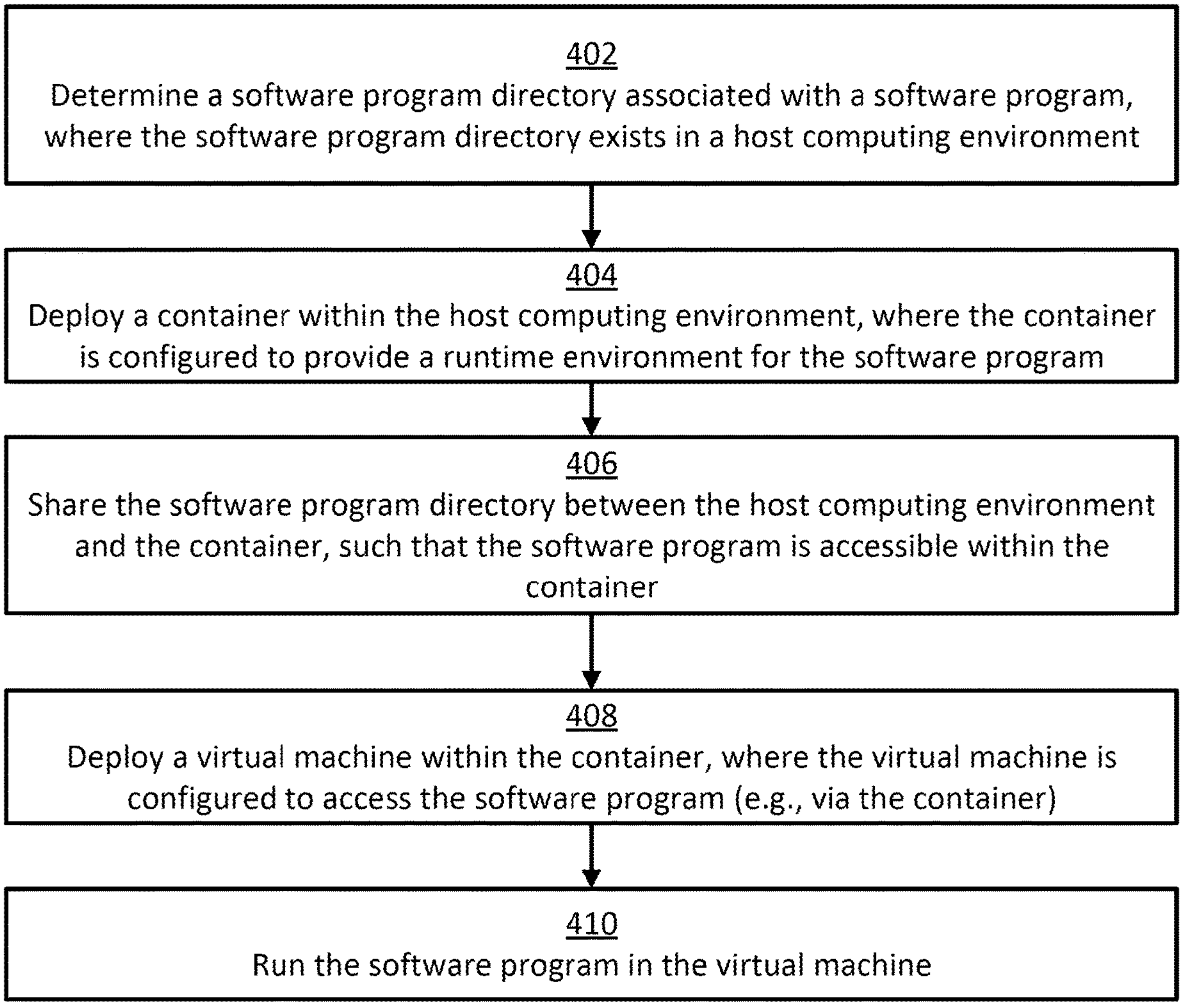
FIG. 4 shows a flowchart of an example of a process for deploying a software program inside a virtual machine within a container according to some aspects of the present disclosure.

Turning now to FIG. 4, shown is a flowchart of an example of a process for deploying the software program 112 inside the virtual machine 108 within the container 300 according to some aspects of the present disclosure. Other examples may have more operations, fewer operations, different operations, or a different order of operations than is shown in FIG. 4. The process of FIG. 4 is described below with reference to the components of FIGS. 1 and 3 above. Some or all of this process may be executed in response to detecting a triggering event for executing the software program 112.

In block 402, the computing device 100 determines a directory associated with the software program 112. The software program directory can exist in the host computing environment 102 and may have one or more files for running the software program 112.

In block 404, the computing device 100 deploys the container 300 within the host computing environment 102. The computing device 100 can use a container engine in the host computing environment 102 to deploy the container 300. The container 300 can be configured to provide a runtime environment for the software program 112.

In block 406, the computing device 100 shares the software program directory between the host computing environment 102 and the container 300, such that the software program directory is accessible in the container 300. This may involve mounting the software program directory to a mount point inside the container 300.

In block 408, the computing device 100 deploys the virtual machine 108 within the container 300, such that the virtual machine 108 is configured to access the software program 112 (e.g., via the container 300). The computing device 100 can use a hypervisor to deploy the virtual machine 108 within the container 300 and grant the virtual machine 108 access to the software program 112, for example via the mount point of the software program directory in the container 300.

In block 410, the computing device 100 runs the software program 112 inside the virtual machine 108.

In the example described above, as well as various other examples described herein, the virtual machine 108 is executed inside the container 300. However, it is also possible to use the inverse arrangement. For instance, these two components can be inversed such that software program 112 is run inside the container 300, which in turn is run inside the virtual machine 108. Thus, the present disclosure is not only limited to arrangements in which the virtual machine 108 runs inside the container 300.

Figure 5:
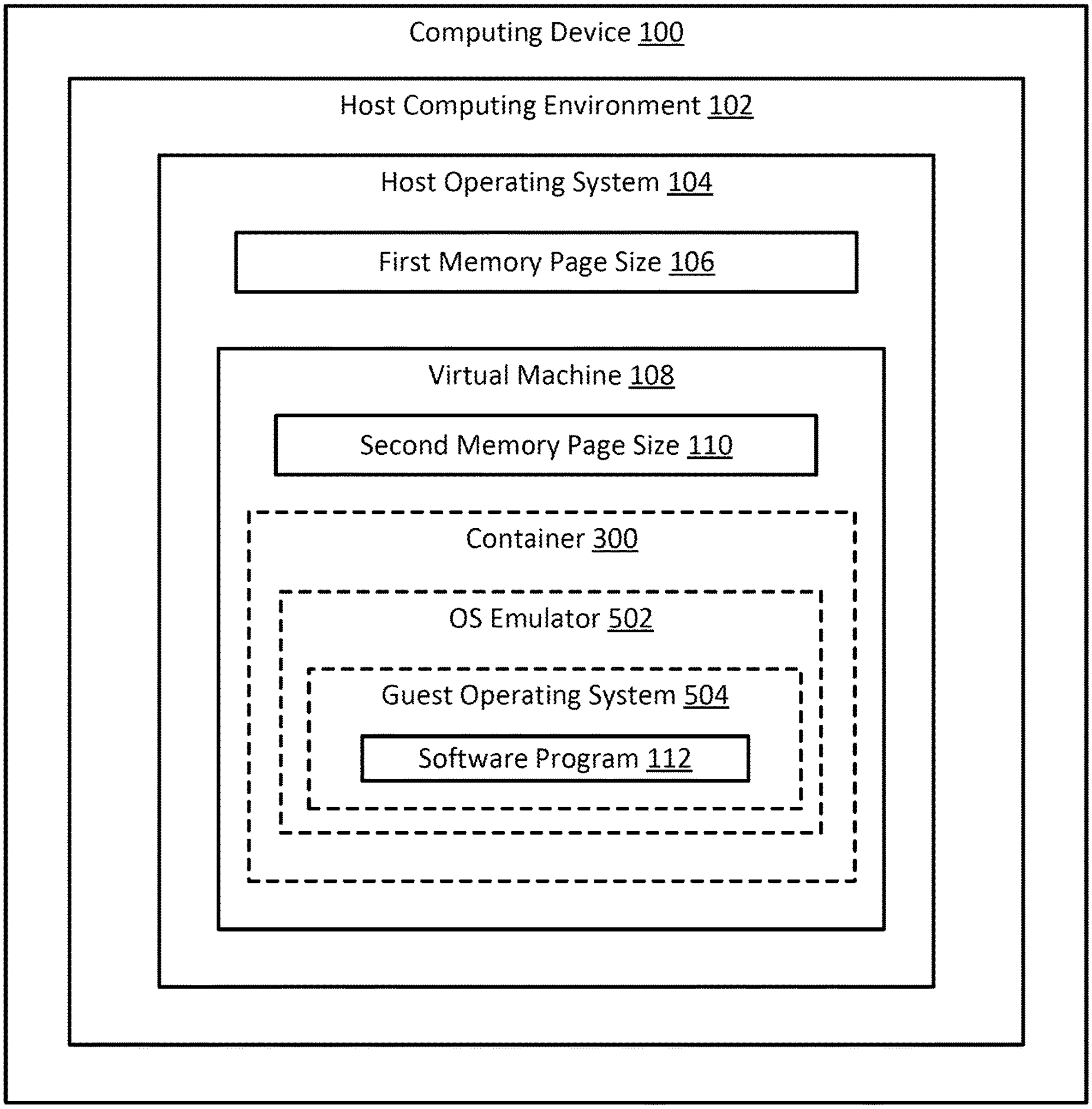
FIG. 5 shows a block diagram of an example of a system for running a software program on a guest operating system according to some aspects of the present disclosure.

Turning now to FIG. 5, shown is a block diagram of an example of a system for running a software program 112 on a guest operating system 504 according to some aspects of the present disclosure. The system includes the computing device 100, which has a host computing environment 102 associated with a host operating system 104. The host operating system 104 can be configured to use a first memory page size 106, such as 16 KB. The host operating system 104 may be a first operating system, such as Red Hat Enterprise Linux®.

In some cases, it may be desirable to run a software program 112 in the host computing environment 102, even though the software program 112 may be configured to use a second memory page size 110 that is different from the first memory page size 106. For instance, the software program 112 may be configured to use an 8 KB page size. Additionally, the software program 112 may be designed for execution on a second operating system that is different than the host operating system 104. For instance, the software program 112 may be designed for execution on Microsoft Windows®. This may add an additional layer of complexity, which normally makes it challenging to execute the software program 112 on the computing device 100. However, the techniques described herein can allow for such execution.

More specifically, in some examples, the computing device 100 can detect a triggering event for executing the software program 112 on the computing device 100. In response, the computing device 100 can determine the second memory page size 110 associated with the software program 112, for example by analyzing metadata (e.g., metadata 114 of FIG. 1) associated with the software program 112. The computing device 100 can compare the first memory page size 106 to the second memory page size 110 to determine that they are different from one another. In response to determining that they are different from one another, the computing device 100 can deploy a virtual machine 108 configured to use the second memory page size 110. The computing device 100 can use a hypervisor (e.g., hypervisor 116 of FIG. 1) to deploy the virtual machine 108.

Additionally, the computing device 100 can determine an operating system associated with the software program 112, for example by analyzing the metadata, which may indicate the intended operating system for the software program 112. For instance, the computing device 100 can determine that the software program 112 is configured to execute on the second operating system. The computing device 100 can compare the second operating system associated with the software program 112 to the first operating system associated with the host operating system 104. If they are different from one another, the computing device 100 can deploy a container 300 inside the virtual machine 108. The computing device 100 can use a container engine to deploy the container 300 inside the virtual machine. The computing device 100 can then execute an operator system (OS) emulator 502 inside the container 300 to deploy a guest operating system 504, which is the second operating system. The OS emulator 502 can allow the host operating system 104 to run software designed for the guest operating system 504. In this example, the OS emulator 502 can allow the host operating system 104 to run the software program 112 designed for the second operating system.

Using the above process, the computing device 100 can automatically deploy the virtual machine 108, the container 300, and/or the OS emulator 502 in response to detecting the triggering event, which can allow the software program 112 to properly execute on the computing device 100. Thereafter, the computing device 100 can determine that the software program 112 is no longer needed or is no longer in use, for instance based on an idle period or a shutdown command (for shutting down the software program 112). In response to making such a determination, the computing device 100 can automatically shut down the OS emulator 502, the container 300, and/or the virtual machine 108, along with the software program 112. This may help conserve resources, because the OS emulator 502, the container 300, and/or the virtual machine 108 may only run for as long as is needed to execute the software program 112.

In other examples, the virtual machine 108, the container 300, and/or the OS emulator 502 may be deployed on the computing device 100 before the computing device 100 detects the triggering event for the software program 112, so that they are already up and running when the triggering event occurs. This may make it faster to start the software program 112 after detecting the triggering event, but may also conserve more computing resources than the prior approach. For instance, prior to detecting the triggering event, the computing device 100 can analyze the metadata associated with the software program 112 to determine that the software program 112 is associated with the second memory page size 110 and the second operating system, perform the comparisons to the first memory page size 106 and the host operating system 102, respectively, and thereby determine the differences. In response to determining the differences, and prior to detecting the triggering event, the computing device 100 may deploy the virtual machine 108, container 300, and/or OS emulator 502. That way, when the triggering event occurs, the computing device 100 is already prepared to run the software program 112. In some examples, the computing device 100 may keep the virtual machine 108, container 300, and/or OS emulator 502 running after the software program 112 is shut down, so that the computing device 100 remains prepared for the next triggering event. Alternatively, the computing device 100 can automatically shut down the virtual machine 108, container 300, and/or OS emulator 502 when the software program 112 is no longer needed or in use, as described above.

Figure 6:
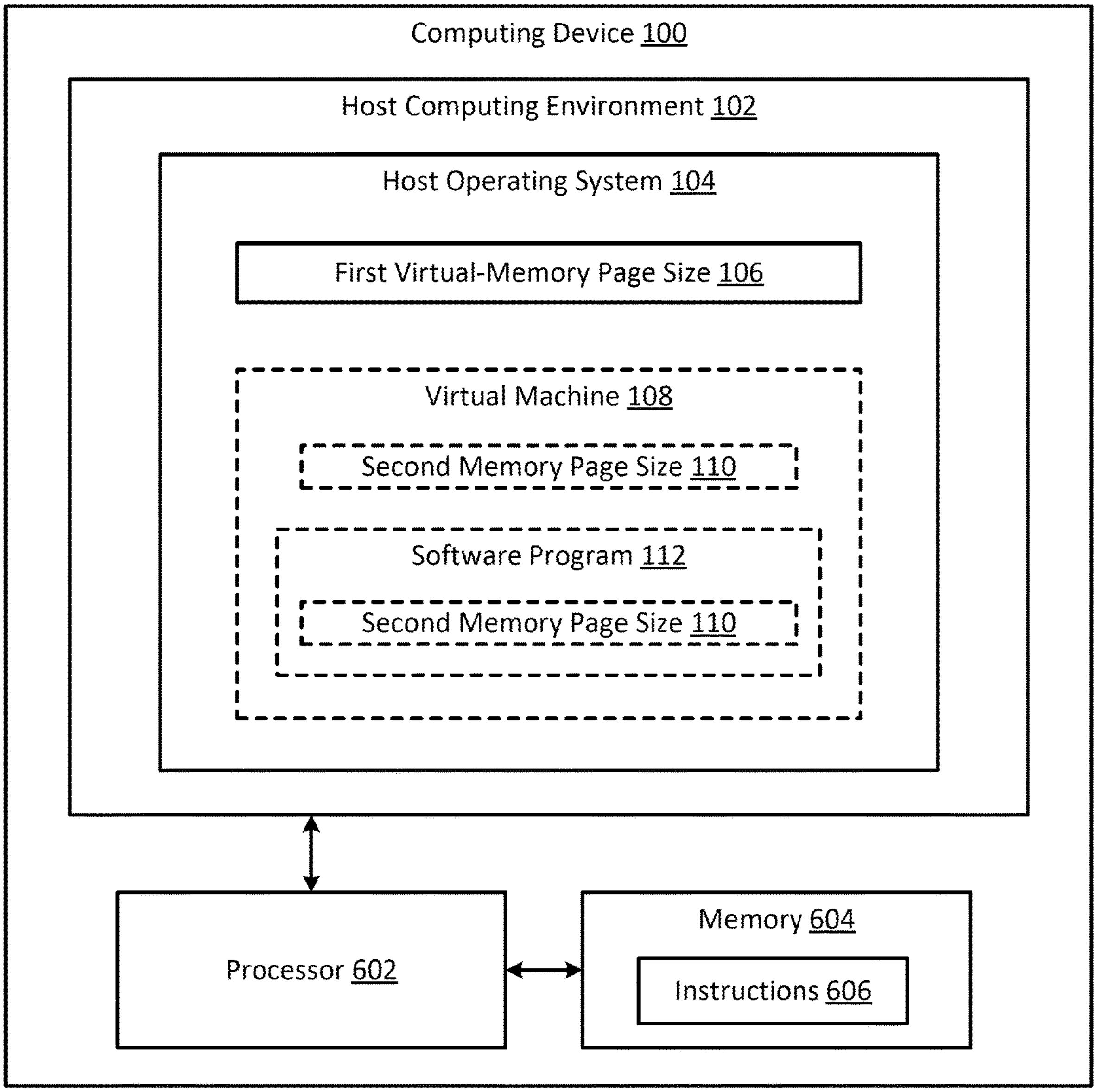
FIG. 6 shows a block diagram of a system for executing a software program that uses a different memory-page size than its host computing environment according to some aspects of the present disclosure.

Turning now to FIG. 6, shown is a block diagram of a system for executing a software program 112 that uses a different memory-page size than its host computing environment 102 according to some aspects of the present disclosure. The system includes a computing device 100, which in turn comprises a processor 602 coupled to a memory 604. The processor 602 is hardware that can include one processing device or multiple processing devices. The processor 602 can execute instructions 606 stored in the memory 604 to perform one or more operations. In some examples, the instructions 606 can include processor-specific instructions generated by a compiler or an interpreter from code written in any suitable computer-programming language, such as C, C++, C#, or Java.

The memory 604 is hardware that can include one memory device or multiple memory devices. The memory 604 can be volatile or non-volatile (it can retain stored information when powered off). Examples of the memory 604 include electrically erasable and programmable read-only memory (EEPROM) or flash memory. At least a portion of the memory device includes a non-transitory computer-readable medium. A computer-readable medium can include electronic, optical, magnetic, or other storage devices capable of providing the processor 602 with the instructions 606 or other program code. Examples of a computer-readable medium include magnetic disks, memory chips, ROM, RAM, an ASIC, a configured processor, optical storage, or any other medium from which a computer processor can read the instructions 606.

The processor 602 can execute the instructions 606 to perform operations. For example, the processor 602 can deploy a virtual machine 108 in the host computing environment 102 of the computing device 100, where the host computing environment 102 includes a host operating system 104 that is configured to use a first memory page size 106. The virtual machine 108 can be configured to use a second memory page size 110 that is different from (e.g., smaller than) the first memory page size 106. Based on a software program 112 being configured to use the second memory page size 110, the processor 602 can execute the software program 112 in the virtual machine 108.

Figure 7:
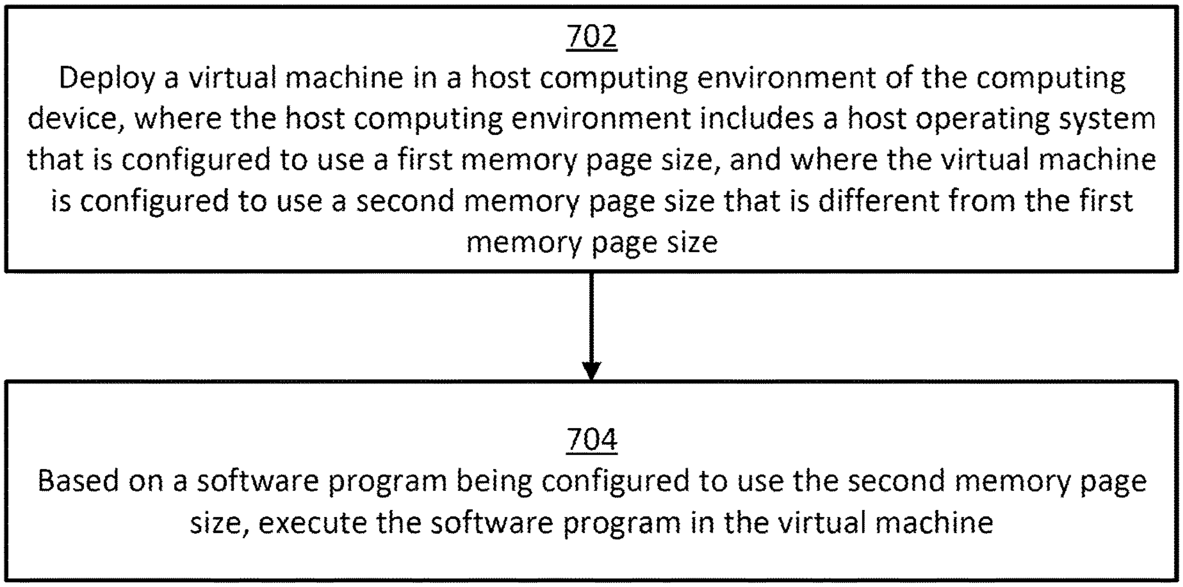
FIG. 7 shows a flowchart of an example of a process for executing a software program that uses a different-memory page size than its host computing environment according to some aspects of the present disclosure.

Turning now to FIG. 7, shown is a flowchart of an example of a process for executing a software program 112 that uses a different memory-page size than its host computing environment 102 according to some aspects of the present disclosure. Other examples may have more operations, fewer operations, different operations, or a different order of operations than is shown in FIG. 7. The process of FIG. 7 is described below with reference to the components of FIG. 6 above.

In block 702, a processor 602 deploys a virtual machine 108 in a host computing environment 102 of a computing device 100. The host computing environment 102 can include a host operating system 104 that is configured to use a first memory page size 106. The virtual machine 108 can be configured to use a second memory page size 110 that is different from (e.g., smaller than) the first memory page size 106.

In some examples, the processor 602 can deploy the virtual machine 108 in response to detecting a triggering event for executing a software program 112, which can also be configured to use the second memory page size 110. That way, the virtual machine 108 may not be deployed until the software program 112 is initiated, which can reduce the resource consumption of the virtual machine 108. Alternatively, the processor 602 can deploy the virtual machine 108 prior to the triggering event. That way, the virtual machine 108 is already running when the triggering event occurs, which can make it faster to start the software program 112 in the virtual machine 108 when triggered.

In block 704, the processor 602 executes the software program 112 in the virtual machine 108. For example, after the virtual machine 108 is deployed, the processor 602 can run the software program 112 in the context of the virtual machine 108. The processor 602 can execute the software program 112 in the virtual machine 108 based on a software program 112 being configured to use the second memory page size 110.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by one or more processors of a computing device for causing the computing device to perform operations including:

detecting a triggering event that initiates execution of a software program on the computing device;

determining a software program directory associated with the software program, wherein the software program directory exists in a host computing environment of the computing device, wherein the host computing environment includes a host operating system that is configured to use a first memory page size;

deploying a container within the host computing environment, wherein the container is configured to provide a runtime environment for the software program;

sharing the software program directory between the host computing environment and the container, such that the software program is accessible within the container;

deploying a virtual machine within the container, wherein the virtual machine is configured to use a second memory page size that is different from the first memory page size, and wherein the virtual machine is configured to access the software program via the container; and based on the software program being configured to use the second memory page size, executing the software program in the virtual machine.

2. The non-transitory computer-readable medium of claim 1, wherein the operations further comprise:

determining that the software program uses the second memory page size; and based on determining that the software program uses the second memory page size:

configuring the virtual machine to use the second memory page size; and executing the software program in the virtual machine.

3. The non-transitory computer-readable medium of claim 2, wherein the operations further comprise:

determining that the software program uses the second memory page size based on metadata associated with the software program.

4. The non-transitory computer-readable medium of claim 1, wherein the operations further comprise:

based on detecting the triggering event:

creating the virtual machine;

configuring the virtual machine to use the second memory page size;

starting execution of the virtual machine; and
running the software program in the virtual machine.

5. The non-transitory computer-readable medium of claim 1, wherein the first memory page size is larger than the second memory page size.

6. A method comprising:
detecting, by one or more processors of a computing device, a triggering event that initiates execution of a software program on the computing device;
determining, by the one or more processors, a software program directory associated with the software program, wherein the software program directory exists in a host computing environment of the computing device, wherein the host computing environment includes a host operating system that is configured to use a first memory page size;
deploying, by the one or more processors, a container within the host computing environment, wherein the container is configured to provide a runtime environment for the software program;
sharing, by the one or more processors, the software program directory between the host computing environment and the container, such that the software program is accessible within the container;
deploying, by the one or more processors, a virtual machine within the container, wherein the virtual machine is configured to use a second memory page size that is different from the first memory page size, and wherein the virtual machine is configured to access the software program via the container; and
based on the software program being configured to use the second memory page size, executing, by the one or more processors, the software program in the virtual machine.

7. The method of claim 6, further comprising:
determining that the software program uses the second memory page size; and
based on determining that the software program uses the second memory page size:
configuring the virtual machine to use the second memory page size; and
executing the software program in the virtual machine.

8. The method of claim 7, further comprising:
determining that the software program uses the second memory page size based on metadata associated with the software program.

9. The method of claim 6, further comprising:
based on detecting the triggering event:
creating the virtual machine;
configuring the virtual machine to use the second memory page size;
starting execution of the virtual machine; and
running the software program in the virtual machine.

10. The method of claim 6, wherein the first memory page size is larger than the second memory page size.

11. A computing device comprising:
one or more processors; and
one or more memories including program code that is executable by the one or more processors for causing the computing device to perform operations including:
detecting a triggering event that initiates execution of a software program on the computing device;
determining a software program directory associated with the software program, wherein the software program directory exists in a host computing environment of the computing device, wherein the host computing environment includes a host operating system that is configured to use a first memory page size;
deploying a container within the host computing environment, wherein the container is configured to provide a runtime environment for the software program;
sharing the software program directory between the host computing environment and the container, such that the software program is accessible within the container;
deploying a virtual machine within the container, wherein the virtual machine is configured to use a second memory page size that is different from the first memory page size, and wherein the virtual machine is configured to access the software program via the container; and
based on the software program being configured to use the second memory page size, executing the software program in the virtual machine.

12. The computing device of claim 11, wherein the operations further comprise:
determining that the software program uses the second memory page size; and
based on determining that the software program uses the second memory page size:
configuring the virtual machine to use the second memory page size; and
executing the software program in the virtual machine.

13. The computing device of claim 12, wherein the operations further comprise:
determining that the software program uses the second memory page size based on metadata associated with the software program.

14. The computing device of claim 11, wherein the operations further comprise:
based on detecting the triggering event:
creating the virtual machine;
configuring the virtual machine to use the second memory page size;
starting execution of the virtual machine; and
running the software program in the virtual machine.

15. The computing device of claim 11, wherein the first memory page size is larger than the second memory page size.

16. The computing device of claim 11, wherein the first memory page size is 4 Kilobytes (KB), 16 KB, or 64 KB.

17. The computing device of claim 11, wherein the second memory page size is 4 KB.

18. The computing device of claim 11, wherein the operations comprise interacting with a hypervisor to run the software program in the virtual machine.

19. The computing device of claim 11, wherein the operations comprise using a hypervisor to configure the virtual machine to use the second memory page size.

20. The computing device of claim 11, wherein the operations comprise:
translating, by a hypervisor, between the second memory page size of the software program and the first memory page size of the host operating system.

* * * * *